C. McWOLFE.
MOTOR.
APPLICATION FILED AUG. 17, 1912.
1,074,059.
Patented Sept. 23, 1913.
5 SHEETS—SHEET 4.
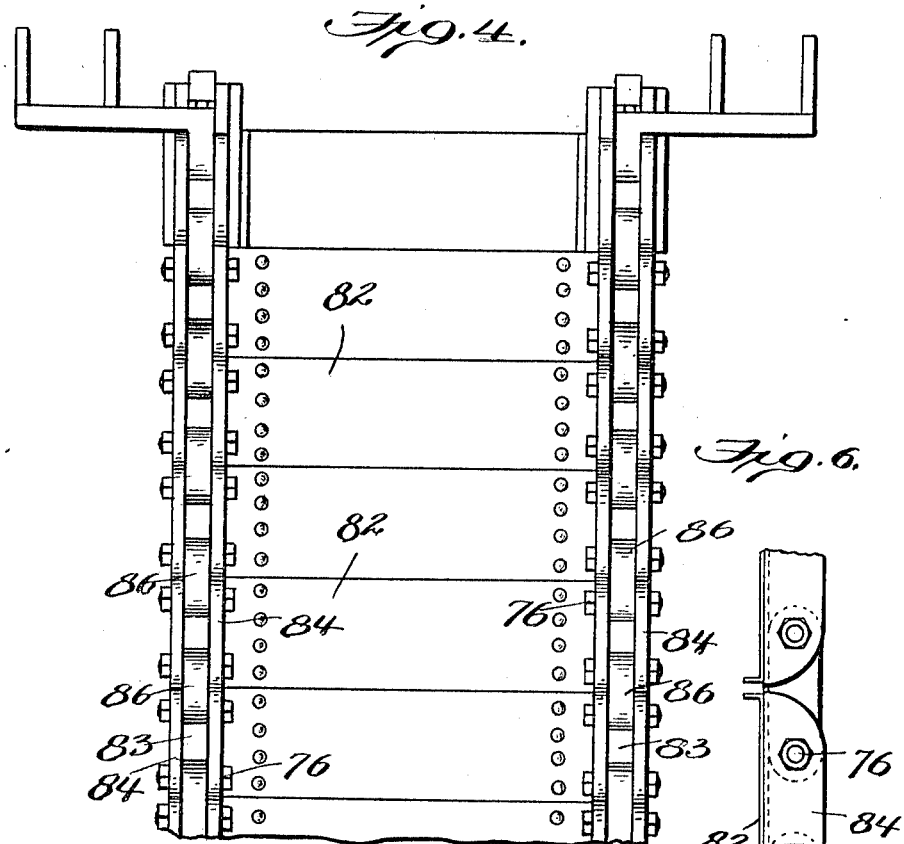
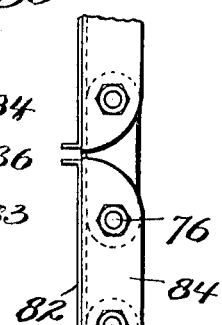
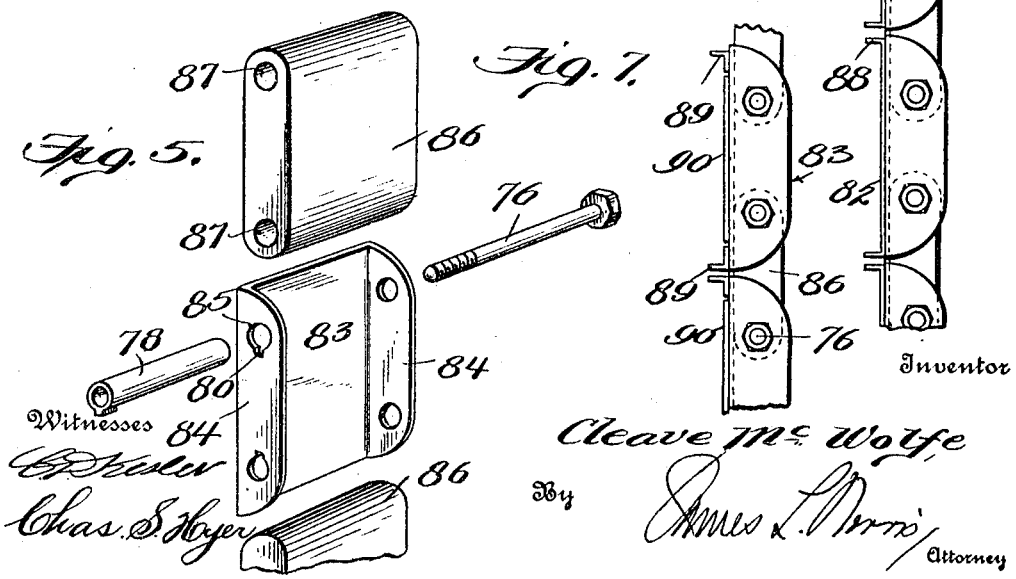
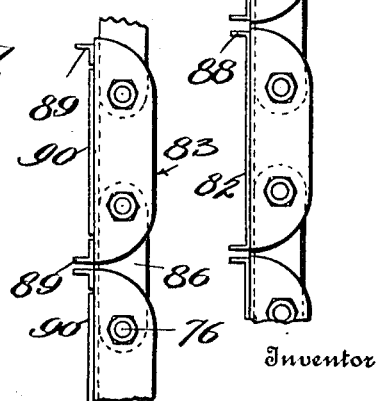
Witnesses
Inventor
Cleave Mc Wolfe
By
Attorney C. McWOLFE.
MOTOR.
APPLICATION FILED AUG. 17, 1912.

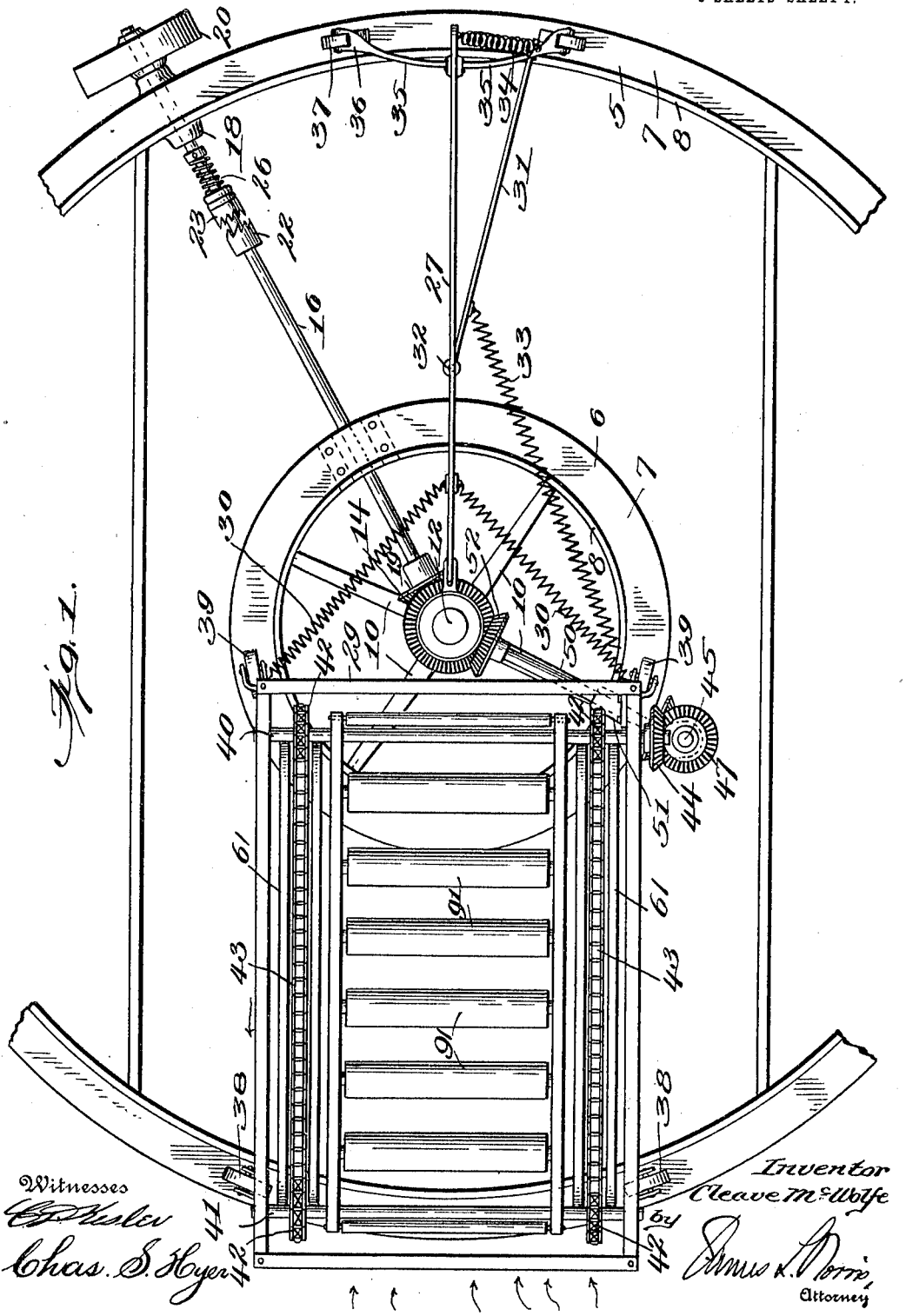

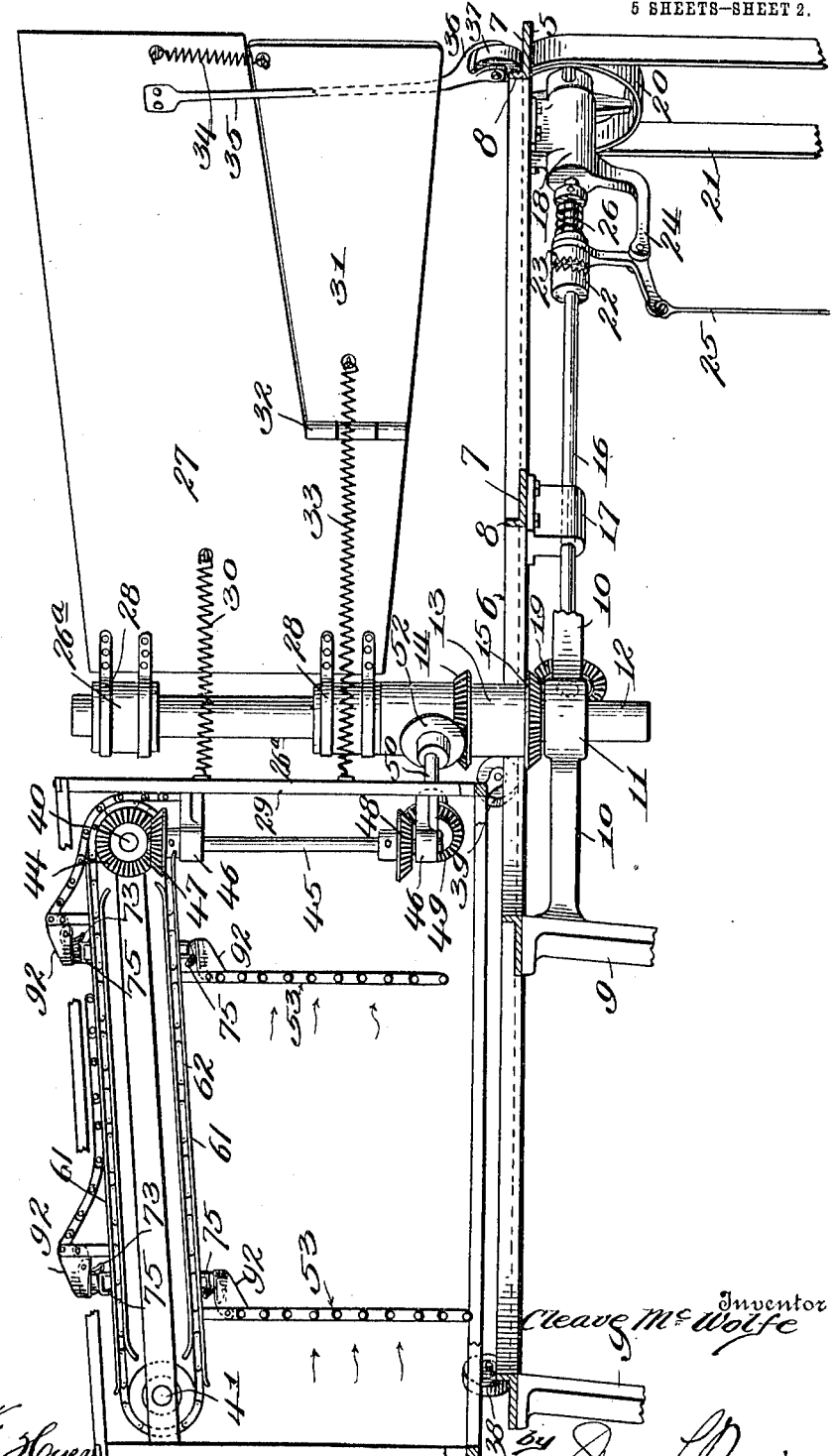

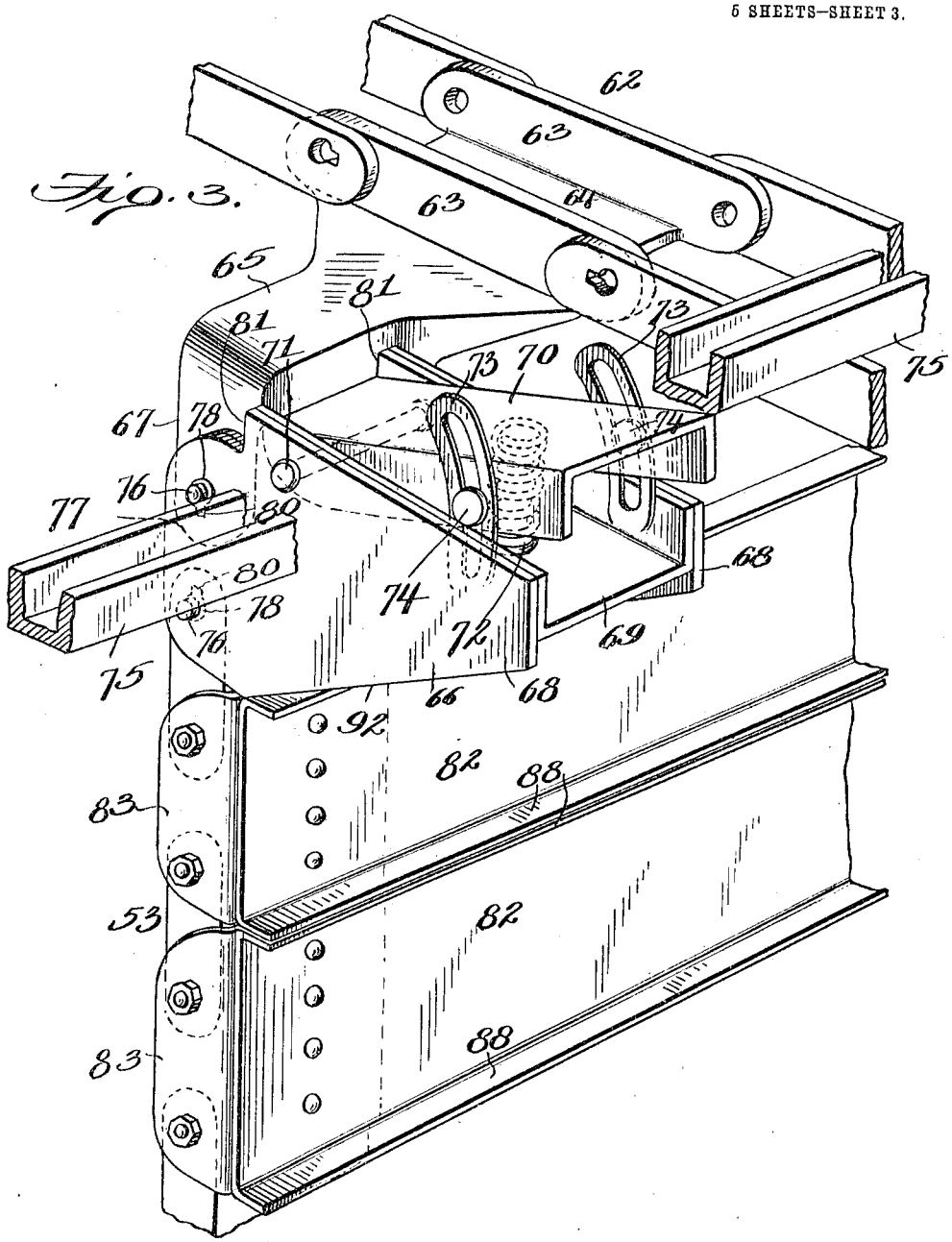

1,074,059.

Patented Sept. 23, 1913.
5 SHEETS—SHEET 5.

Witnesses
Chas. S. Hyer

Inventor
Cleave McWolfe
By
Attorney

UNITED STATES PATENT OFFICE.

CLEAVE McWOLFE, OF VERNAL, UTAH.

MOTOR.

1,074,059.   Specification of Letters Patent.   Patented Sept. 23, 1913.

Application filed August 17, 1912.   Serial No. 715,669.

*To all whom it may concern:*

Be it known that I, CLEAVE McWOLFE, a citizen of the United States, residing at Vernal, in the county of Uinta and State of Utah, have invented new and useful Improvements in Motors, of which the following is a specification.

This invention relates to motors adapted to be actuated by air or water, and when arranged to be operated by air it replaces or serves as a substitute for the usual form of wind wheel and is automatically disposed to the best advantage in the course of the wind current. The object of the invention is to provide a motor having an effective operation in the generation of power and capable of remaining in a position for operation irrespective of the force of the current of the actuating medium without liability of breakage or injury or a deterioration in the power generated and transmitted therefrom.

With this and other objects and advantages in view the invention consists in the construction and arrangement of the several parts which will be more fully hereinafter described and claimed.

Figure 8:
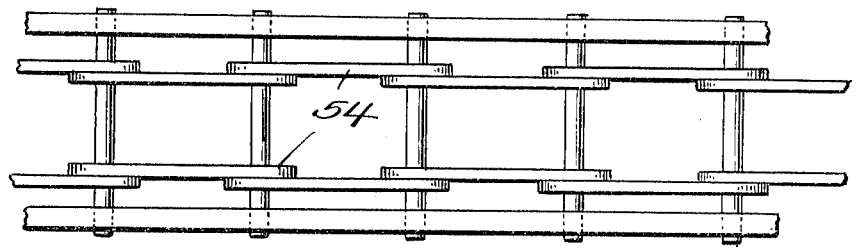
Figure 9:
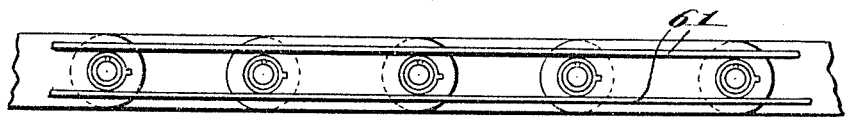
Figure 10:
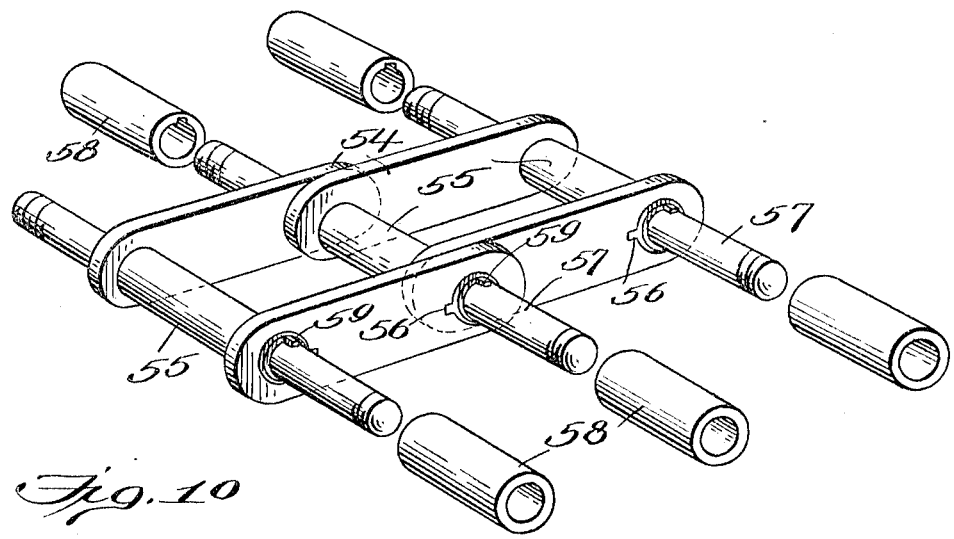
Figure 11:
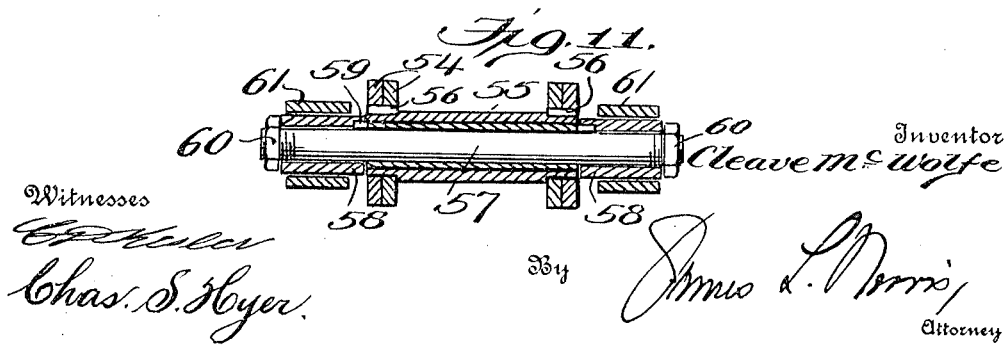

In the drawings: Figure 1 is a top plan view of a motor, partially broken away, and embodying the features of the invention. Fig. 2 is a sectional side elevation of the same. Fig. 3 is a perspective view of a portion of the motor and particularly showing the vanes. Fig. 4 is an end elevation of a portion of the motor showing a portion of the vanes and the chains or chain belts to which the said vanes are connected. Fig. 5 is a detail perspective view of a portion of one of the vane chains or belts showing the parts thereof separated. Fig. 6 is an edge elevation of a portion of one of the vane chains. Fig. 7 is an edge elevation of a portion of one of the vane chains shown broken away in part and illustrating a modification. Fig. 8 is a plan view of the main chain or traveling belt and the guides therefor, the latter being shown broken away in part. Fig. 9 is a side elevation of the structure shown by Fig. 8. Fig. 10 is a detail perspective view of a portion of the main chain showing parts thereof separated therefrom. Fig. 11 is a transverse vertical section through one of the bolts or spindles of the main chain and across the guides.

The table of the motor when arranged for propulsion by air, as particularly shown by Figs. 1 and 2, consists of circular tracks 5 and 6 concentrically disposed and having flat traction surfaces 7 and inner flanges 8, the track 6 being of considerably less diameter than the track 5, and the two tracks supported by uprights or frame bars 9 which may involve the usual tower structures, such as braces and supports as now commonly adopted in wind wheel structures. It will be understood that the tracks 5 and 6 may be held at any suitable elevation above the ground surface, and to secure the best results they will be at such elevation as to dispose the motor mechanism coöperating therewith to the best advantage relatively to the air currents. Extending inwardly from the track 6 is a plurality of radial arms 10 which constitute with a central bearing sleeve 11 a spider in which the lower end or extremity of a shaft 12 is suitably supported, the said shaft constituting an upright fulcrum rod for the mounting of the several parts which will be more fully hereinafter explained. On the shaft or rod 12 a hollow shaft 13 is mounted for free rotation and carries reversely positioned bevel gear collars or members 14 and 15 for respectively receiving and transmitting the power generated by the motor mechanism, a power shaft 16 being mounted in suitable hangers 17 and 18 depending from the tracks 6 and 5 and having a pinion 19 on its inner end held in continual mesh with the gear collar 15 and also provided with a band pulley 20 on its outer end from which a belt 21 extends to suitable power transmitting mechanism below for use in operating a pump or driving machinery generally. The shaft 16 is made in two sections adapted to be connected by clutch members 22 and 23 and operative through a lever mechanism 24 by means of a pull-cord 25 depending in easy reaching distance of an operator at the lower portion of the tower or superstructure on which the motor as a whole is mounted, the clutch being controlled by a spring 26 to normally tend to draw the clutch member 23 backwardly or away from the clutch member 22, the engagement of the clutch members 22 and 23 being established by pulling downwardly on the cord 25 against the resistance of the spring 26 and whereby the clutch member 23 through the medium of the bell crank lever to which the cord 25 is attached is shifted into engagement with the clutch member 22. By releasing pulling tension on the cord 25 the clutch member 23 immediately disengages itself through the action of the spring 26 from the clutch member 22. By this means the motor mechanism may continue to run and one section of the shaft 16 rotated without actuating the band pulley 20 and the belt 21, the pull-cord 25 under such conditions being held down by securing the same in any suitable manner.

Through the medium of sleeves 26ª a tail vane 27 is associated with the shaft or rod 12, straps or analogous devices 28 being secured to the inner end of the vane and engaging the said sleeves. The tail vane 27 is resiliently connected to a motor frame 29 by springs 30 extending away from the opposite sides of the tail vane in divergent planes and attached to the opposite side portions of the said motor frame. Normally the tail vane is drawn in central relation or occupies a position in the plane of the central longitudinal plane of the motor or motor frame 29, as clearly shown by Fig. 1, and when the wind strikes either one side or the other of the said tail vane, the latter, together with the motor frame and motor, are shifted so as to bring the motor vanes into the eye of the wind, the shifting of the motor frame and motor by the tail vane being accomplished yieldingly through the action of the springs 30 which operate to exert a yielding pull on the motor and motor frame through the medium of the tail vane against which the wind may have forceful impact, and slight variations in the change of direction of the wind will not displace the motor frame and motor during the time that the wind is blowing mainly from one direction and thereby the effective operation of the motor is not modified by what is known as flaws in the wind. By this means also the motor frame and motor will be held in such position relatively to the direction in which the wind is blowing as to be most effective in the regular generation of power. When the tail vane is relieved of the wind pressure or when the motor frame and motor, together with the tail vane, have swung around so as to bring the vanes of the motor in the best position relatively to the wind, the tail vane is relieved of maximum pressure and resumes its normal position as shown by Fig. 1 through the action of the springs 30. The lower outer portion of the tail vane has an auxiliary vane 31 hinged thereto, as at 32, and normally standing outwardly from the main tail vane as shown by Fig. 1, the said auxiliary tail vane having a spring 33 attached thereto and to the motor frame 29. The upper portion of the outer end of the auxiliary vane 31 has an upwardly extending spring 34 attached thereto and to the portion of the main tail vane above the same, the said spring 34 operating to restrict the open angular position of the auxiliary tail vane 31 relatively to the main tail vane. When a wind current forcefully strikes the auxiliary tail vane 31 on the side to which the springs 33 and 34 are attached, said vane is moved inwardly toward or close to the main tail vane 27, and by this means considerable shock or jar is obviated with respect to the main tail vane, as the auxiliary tail vane operates as a yielding pressure means. When a current of wind forcefully strikes the opposite side of the vane 27 it also engages the open auxiliary vane 31 and the latter materially reduces the excess pressure on the vane 27 by providing a ventage when the said auxiliary vane 31 swings open, and the said vane 31 is of itself protected against breakage and cushioned by the strain through the action of the spring 34. It will be understood that the object of swinging the main tail vane around through the medium of the auxiliary tail vane is to provide for sudden changes in the direction of the wind or to accommodate irregularity of wind currents without impairing the tail vane structure as a whole. The tail vane organization just described is maintained in positive position on the shaft or rod 12 by the lower sleeve 26ª bearing on the upper end of the tubular shaft 13, or the upper extremity of this shaft may be in the form of an interposed sleeve as may be desired and which is an obvious equivalent. To the outer end of the main tail vane 27 depending legs 35 are secured and extend downwardly and outwardly at reverse angles of inclination and each has a fork 36 formed at its lower end to receive a roller 37, the rollers 37 engaging the outer track 5 and by this means the tail vane structure is given a stable support at its outer extremity and at the same time permitted to have an easy movement through the medium of the rollers 37 freely traveling over the outer track 5.

The motor frame 29 is of open structure, and to the bottom thereof rollers 38 and 39 are attached respectively at the outer and inner portions thereof, the said rollers engaging the outer and inner circular tracks 5 and 6 to render the motor frame sensitive to change of movement in accordance with the direction of the wind by the action of the tail vane organization above described. In the upper part of the motor frame 29 adjacent to opposite ends of the latter, shafts 40 and 41 are mounted and have thereon sprocket wheels 42, there being two sprocket wheels on each shaft. Trained over these sprocket wheels 42 are main chain belts 43 each of which is similar in construction and will be more fully hereinafter explained in detail. The power generated in the motor by the action of the wind is transmitted through the main chains 43 and through the latter to the shafts 40 and 41 and sprocket wheels 42 and is taken off from the shaft 40 through a bevel pinion 44 on the one projected end of the said shaft 40. A suitable counter-shaft 45 is held in bearing brackets 46 at the inner end of the frame 29, and on the upper end of said counter-shaft is a bevel pinion 47 held in continual mesh with the pinion 44. A bevel pinion 48 is secured on the shaft 45 adjacent to the lower bracket 46 and is held in mesh with a pinion 49 on the outer end of a transmitting shaft 50 also mounted in a suitable bearing 51 secured to the inner lower portion of the frame 29, as shown by Fig. 1. On the inner end of the shaft 50 is keyed a bevel pinion 52 which is held in mesh with the bevel collar or member 14 and through the medium of the hollow shaft 13 carrying said collar and the lower similar collar 15 the power of the motor is transmitted to the shaft 16 by the bevel pinion or gear 19. The top portion of the motor frame is downwardly inclined from its inner end toward the outer end thereof, as shown by Fig. 2, to give the most effective operation of the air currents relatively to depending vanes of a particular type, as at 53, by the air currents, or to provide for a maximum dependence of the propelling vanes 53 as they come into operative position at the outer end of the motor frame after being carried over the top of the motor frame by the main chains 43 so that each vane as it comes into operative position constitutes a movable pendant partition which shifts through the lower portion of the frame and provides a wind impacting surface of effective area while traveling inwardly until a succeeding similar vane comes into position adjacent to the outer end of the motor frame and receives the impact of the air currents. The upper downwardly and outwardly inclined structure or top portion of the motor frame 29 relieves to some extent the resistance to travel or movement of each vane over the top of the motor frame and, furthermore, facilitates the overthrow and operative disposition of each vane as the latter reaches the outer lower end of the top of the frame. Each vane 53 is composed of a plurality of movably associated members which maintain a rigid dependent relation when disposed as shown by Fig. 2 to receive the impact of the air currents, but when these vanes move upwardly over the top of the motor frame they relax or become flexible, the several members of each vane being jointed to permit this flexible action.

Each main chain is composed of a series of members or elements, as shown by Figs. 8, 9, 10 and 11, and consisting of links 54 terminally overlapped, as shown by Figs. 8 and 10, and having sleeves 55 extending through openings in the ends thereof and keyed therein as at 56. Extending through the sleeves 55 and projecting outwardly on opposite sides of the links any suitable distance are spindles or rods 57 which constitute pintles for the links as well as means for supporting antifrictional devices in the form of spools or rollers 58 which are mounted on the outwardly projecting ends of the said spindles and engaged by key lugs 59 carried by the spindles so that the latter and the spools or rollers 58 unitedly rotate and the spindles or rods 57 in turn rotate in the sleeves 55, thereby removing wear directly from the links 54 and providing positive engaging devices for the sprocket wheels 42 on the shafts 40 and 41. The sleeves 55 constitute spreaders for the links and have their opposite ends abutting against the inner sides of the links, as clearly shown by Fig. 11, the said sleeves being mounted on longer sleeves 59$^a$ having the keys 56 at opposite ends engaging the links. The spools or rollers 58 are held on the projecting extremities of the spindles or rods 57 by nuts 60, as shown by Fig. 11. The spools or rollers 58 move between upper and lower guides 61 which terminate adjacent to the sprocket wheels 42, as shown, and have deflected terminals to accommodate the relaxation of the links and angular positions thereof in passing over the said sprocket wheels.

At regular intervals each main chain 43 is equipped with or comprises a specific coupling link 62, as particularly shown by Fig. 3, and consists of side members 63 connected by a bottom web or plate 64, the ends of the side members being connected to the adjacent links by the rods and sleeves just described. Extending outwardly from the bottom portion of each coupling link is an angle arm 65 of such thickness as to render it strong and durable, the similar links 62 of each main chain being in transverse alinement and provided with similar arms 65 to which the vanes 53 are attached. A bracket 66 is secured to each arm 65 and is of the form shown by Fig. 3. It will be seen that the arm 65 has a depending angular member 67 and the bracket 66 is supported by the said depending arm member. Each bracket comprises opposite side plates 68, a channeled body member 69 between the said plates and an inverted channeled cushioning member or device 70 which is movable in the member 69 and is pivoted at one end within the said member 69 and between the sides of the latter and the plates 68 by a fulcrum rod 71 which is located adjacent to the depending angular member 67 of the arm 65. The cushioning member or device 70 has a rocking movement in the body member 69 and is normally held at an upward angle at its free end relatively to the body member 69 by a spring 72 interposed between the cushioning device or member 70 and the body member 69. Rising from the body member 69 are segmental slotted guides 73 which are engaged by studs 74 extending outwardly from the opposite sides of the cushioning member or device 70, and by this means the said cushioning device at its free extremity is regularly guided in its movements into and upwardly from the body member 69 and also prevented from having lateral play to insure its depression into the body member. The spring 72 is normally of such tension as to hold the cushioning member or device 70 together with a channeled cross brace or reinforce 75 extending thereover and engaging the same in elevated position, as shown by Fig. 3. The cross brace 75 operates not only as a tie, but as a stress resisting means relatively to the brackets carried by the opposite arms 65 and extends over the main chains 43 and serves as a support for the vane attachments as just explained as well as to brace and reinforce the latter and preserve a positive movement of the opposite brackets of the two main chains without imposing irregular drag or operation of one chain relatively to the other. The side plates 68 are enlarged at the extremities attached to the depending angular members 67 of the arms 65, or in other words, the said plates gradually diverge from their free toward their attached extremities to facilitate the association of the parts of the vanes 53. The depending angular members 67 of the arms 65 serve as coupling or solid link means and the side plates 68 perform the function of braces, said plates being connected to the depending angular member of each arm by pivot bolts or fulcrums 76 which also pass through forward extensions or ears 77 of the channeled body member 69, the pivot bolts or fulcrums 76 extending through sleeves 78 passing through the lower extremities of the depending angular members 67, and said sleeves being prevented from turning by keys 79 engaging key slots 80, as will be more fully hereinafter described and shown in detail by Fig. 5. The side plates 28 and the opposite sides of the channeled body 69 are shouldered or cut away as at 81 to form respectively the attaching portions of the said side plates and the ears 77, and the shoulders 81 in part brace against or serve as stops relatively to the adjacent edges of the arms 65 to hold the brackets against movement when the propelling vanes 53 are in depending operative positions to receive the impact of the air currents. The brackets are free to move in the opposite direction to readily compensate for change of position when the said brackets and the vanes connected thereto are moving around the ends and over the top of the motor frame or in traveling over the shafts 40 and 41 of the sprocket wheels 42 and above the upper portions of the chains or chain belts 43.

The propelling vanes 53 in addition to the brackets just explained are composed of a plurality of closely arranged channel irons or bars 82 having box links 83 riveted or otherwise secured to the ends thereof on one side of each, the outer side portions of these links 83 being projected outwardly a slight distance beyond the ends of the irons or bars 82. The box links 83 are shown in detail by Fig. 5 and embody side flanges 84 having openings 85 therein adjacent to opposite extremities and in transversely alined pairs, the key slots 80 heretofore referred to being continuous with the openings 85 in one of the flanges. The box links are connected by solid links 86 having transverse end bores 87, the opposite extremities of each of the links 86 being held within the opposite extremities or between the flanges 84 of the said box links 83. The sleeves 78 are inserted through the openings 85 and 87 and the bolts or fulcrums 76 are inserted through the said sleeves, the links 86 having pivotal movement on the sleeves and the links 83 having a pivotal action through the sleeves fixed therein on the said bolts, and by this means the vanes are given sufficient flexibility to conform to the several movements to which they are subjected in traveling over the upper portion of the frame of the motor. When the several bolts 76 are applied they are secured by nuts. The side flanges 88 of the channel irons or bars 82 occupy a rear position when the propelling vanes depend in operative relation to the main chains 43 and serve as stops to resist rearwardly folding movement of the said irons or bars 82 and a rigid structure is thus produced to receive the impact of the air currents. In the arrangement of the propelling vane members as shown in detail by Fig. 7, abutting angle irons 89 are secured to the back portions of the box links 83 and plates or sheets 90 are also attached to said links between the angle irons and in close relation to the latter, and if desired this construction may be adopted, but it is preferred that that shown by Figs. 3 and 5 be used, as in the latter instance the parts are more readily assembled. In all structures the flanges 88 or the angle irons 89 have their contiguous flanged portions slightly spaced to give a yielding movement in a rearward direction to obviate to a material extent a strain on the several parts when the air currents, for instance, have an irregular impacting force or strike the vanes with greater pressure at certain times, and, furthermore, this spaced relation of the flanges accommodates the various movements of the propelling vanes over the upper portion of the motor frame and the shafts 40 and 41. In moving over the top of the motor frame the members of the propelling vanes engage idle rollers 91, as clearly shown by Fig. 1, and by this means the propelling vanes are held up and maintained in position to readily fall over the outer lower end of the top of the motor frame, and to facilitate this overturning movement the lower edges 92 of the plates or braces 68 are inclined and give a clearance to the propelling vane members or irons or bars 82 adjacent thereto.

The motor as shown in the drawings is particularly adapted for air operation, but it will be understood that the motor proper comprising the frame 29 or a similar structure, together with the vanes 53, may readily be disposed in the current of a river or other body of water and be similarly operated to produce power which may be taken from the shaft 40 by any suitable or well known means and transmitted overland from the banks of a river or stream to any point desired. It will be understood that when the device is used in this manner as a water motor, the tail vanes will be unnecessary and, furthermore, the frame 29 may be modified to accommodate such application and be provided with suitable anchoring means, such as cables or chains.

From the foregoing the operation of the motor will be readily understood, the impact of the propulsive medium against the vanes 53 operating through the chains 43 the shafts 40 and 41 and from which the power is taken, as hereinbefore explained.

What is claimed is:

1. In a motor of the class specified, the combination of a frame, chain belts mounted on said frame, a plurality of flexible propelling vanes carried by said chain belts and movable over the top portion of the frame, the chain belts having arms projecting outwardly therefrom to which brackets are attached for supporting the said vanes, mechanism operated by said chains, and means for transmitting the power generated from the said mechanism.

2. In a motor of the class specified, the combination of a frame, chain belts mounted on said frame, a plurality of flexible propelling vanes depending from the chain belts within the frame to receive the impact of a propelling medium, the chain belts being provided with outwardly extending arms having brackets attached thereto to which the vanes are connected, means for moving the said propelling vanes to and from their operative position relatively to the propelling medium, and mechanism for taking the generated power from the said means.

3. In a motor of the class specified, the combination of a frame having an outwardly and downwardly inclined top portion, chain belts mounted on said frame and movable over the inclined top portion thereof, the chain belts being provided with outwardly projecting arms having brackets attached thereto, a plurality of jointed propelling vanes movable over the top portion of the frame and attached to said brackets, the propelling vanes adapted to depend within the said frame to receive the impact of the propelling medium, means to which the movement of the vanes is imparted, and mechanism for transmitting the power generated by the vanes to a point distant from the motor.

4. In a motor of the class specified, the combination of a frame having transversely extending shafts in the top portion thereof provided with sprocket wheels, chain belts engaging said sprocket wheels, the said chain belts including at intervals links having outwardly extending angular arms, brackets provided with cushioning members and secured to said arms, vane members movably connected at their ends and to the said brackets and arms and adapted to depend into the frame to receive the impact of the propelling medium, a transversely extending bracing means engaging the cushioning devices of the brackets and movable with the latter and the propelling vanes, and mechanism for taking the power generated from one of said shafts and transmitting it to a point distant from the motor.

5. In a motor of the class specified, the combination of a frame having a plurality of flexible propelling vanes movable in sequence over and around the top portion of the frame, circular means upon which the frame is shiftably mounted, a tail vane connected to the frame and having springs attached to opposite portions thereof and to the adjacent part of the motor to equalize a pulling tension on opposite sides of the vane, the tail vane being provided at its outer extremity with an auxiliary spring-actuated vane which is hinged to the outer lower portion of said tail vane and movable independently thereof as well as therewith, a circular frame on which the tail-vane has movement, the tail vane being provided with rollers to engage the circular frame, and mechanism for receiving and transmitting the power generated by said propelling vanes.

6. In a motor of the class specified, the combination of a frame having a plurality of flexible propelling vanes movable in sequence over and around the top portion of the frame, means upon which the frame is shiftably mounted, a tail vane connected to the frame and also shiftable on a portion of said means, the said tail vane having an auxiliary vane hinged to the lower portion thereof and normally standing in angular open relation thereto, springs connecting the opposite sides of the tail vane to the said frame and the auxiliary vane to the tail vane, and mechanism for receiving and transmitting the power generated by the said propelling vanes.

7. A motor of the class specified comprising in its organization a plurality of propelling vanes having a series of vane members movably connected to each other at their ends and provided with flanges adjacent to their points of connection and on their rear sides, the vanes having a pendant disposition when receiving the impact of the wind, chain belts having arms projecting outwardly therefrom to which brackets are attached for movably supporting the vanes, means over which the chain belts move, and mechanism with which the vanes and chains coöperate for transmitting power generated by the vanes.

In testimony whereof I have hereunto set my hand in presence of two subscribing witnesses.

CLEAVE McWOLFE.

Witnesses:
VICTOR WOURMS,
FRANK L. ZELLER.

Copies of this patent may be obtained for five cents each, by addressing the "Commissioner of Patents, Washington, D. C."